United States Patent [19]

Redlich

[11] Patent Number: 5,153,587

[45] Date of Patent: Oct. 6, 1992

[54] MONITOR FOR INSTRUMENT LANDING SYSTEM

[76] Inventor: Robert W. Redlich, 9 Grand Park Blvd., Athens, Ohio 45701

[21] Appl. No.: 663,008

[22] Filed: Mar. 1, 1991

[51] Int. Cl.$^5$ .............................. G08G 5/00; G01S 1/16
[52] U.S. Cl. ...................................... 340/947; 342/413
[58] Field of Search ............... 340/945, 947, 952; 364/429; 342/33, 34, 35, 420, 413, 410, 411, 412, 408

[56] References Cited

U.S. PATENT DOCUMENTS

| | | | |
|---|---|---|---|
| 3,302,202 | 1/1967 | Gouriet | 342/413 |
| 3,308,466 | 3/1967 | Benjamin | 342/413 |
| 3,323,125 | 5/1967 | Lunn et al. | 342/413 |
| 3,680,120 | 7/1972 | Benjamin | 342/411 |
| 3,866,228 | 2/1975 | Alford | 342/413 |
| 4,032,920 | 6/1977 | Martin, Jr. et al. | 342/413 |
| 4,415,899 | 11/1983 | Vogel et al. | 342/413 |
| 4,605,930 | 8/1986 | Redlich | 342/413 |
| 4,907,005 | 3/1990 | Redlich | 342/413 |

Primary Examiner—Jin F. Ng
Assistant Examiner—Brent A. Swarthout

[57] ABSTRACT

Disclosed is an improvement to Integral Monitoring of two-frequency Instrument Landing System Localizer transmitting antenna arrays, by means of which the Clearance signal can be precisely separated from the combined Course and Clearance output of an Integral Monitor recombiner and monitored as if it existed alone. A first detector detects a composite Clearance and Course signal input, and sends an output to a separation filter which does not pass frequencies of 0, 90 or 150 hertz, but does pass frequencies of the difference between Course and Clearance frequencies ($\Delta f$), $\Delta f \pm 90$ hertz, and $\Delta f \pm 150$ hertz. The output of the filter is input to a second detector which measures the difference between the percentages of 90 and 150 hertz amplitude modulations of an amplitude modulated carrier having a frequency $\Delta f$.

1 Claim, 2 Drawing Sheets

WAVEFORM AT "B"

WAVEFORM AT "C"

MONITOR FOR INSTRUMENT LANDING SYSTEM

BACKGROUND OF THE INVENTION

The following references relate to Instrument Landing System Localizers:
1) U.S. Pat. No. 4,415,902;
2) U.S. Pat. No. 4,907,005; and
3) U.S. Pat. No. 4,605,930.

Instrument Landing System (ILS) Localizers provide azimuth guidance to aircraft on final approach to landing. Localizers commonly radiate two superimposed beams. One of these, called "Course" signal, is confined to a relatively narrow angular region on either side of a vertical plane through runway centerline. The other, called "Clearance" signal, typically extends from about ±4° to ±35° from the same vertical plane. Course and Clearance are radiated on different carrier frequencies in the 108-112 megahertz band. Typically, the two carries differ by about 8 khz. Further details may be found in the references.

Course and Clearance are radiated by a single antenna array in many cases, and transmissions from the array are monitored by an "Integral Monitor" which consists of a recombiner (Ref. 3, e.g.) that sums signals from pickups installed on each antenna of the array to form an analog of the composite Course and Clearance signal radiated at a specific azimuth angle. Zero degrees azimuth and a "width angle" of approximately 2° azimuth are always monitored. In the United States, FAA specifications require separation of the composite signal into its constituent Course and Clearance components, so that Course and Clearance are separately monitored as if each existed alone. The present invention is a means of precisely achieving the required separation, using a single recombiner, conventional monitor detectors, and a simple, non-critical audio filter. It is simpler, cheaper, and more precise than prior art, which achieves separation by means of networks that form weighted sums of the signals from individual integral monitor pickups, these sums being weighted so that the network output is either all Course signal or all Clearance signal.

SUMMARY OF THE INVENTION

The physical basis for the present invention is the fact that, at zero degrees azimuth and at the width angle, Course exceeds Clearance by at least 10 db., in order that airborne receivers will be "captured" by Course signal, that is, respond as if Clearance was absent. Capture occurs because the weak Clearance signal beats against Course to generate amplitude modulation of Course at a frequency $\Delta f$ equal to the difference between Course carrier frequency and Clearance carrier frequency, and $\Delta f$ is outside the passband of subsequent circuitry which measures the difference in depth of modulation (DDM) of the 90 and 150 hz. modulations that carry azimuth information. Deviation if the pilot's ILS indicator is proportional to DDM.

The invention recovers Clearance DDM from the normally unused amplitude modulation (AM) at $\Delta f$. It recognizes and uses the fact that superposition of a weak Clearance signal on a strong Course signal is a heterodyning process in which Course signal plays the role of a local oscillator. If the composite signal is subjected to AM detections, as it is in the invention, an intermediate frequency $\Delta f$ will exist which is modulated by the same percentages of 90 and 150 hz. as were originally impressed on the Clearance carrier of the composite signal. In the invention the intermediate frequency is separated from the demodulated 90 and 150 hz. Course signals by a simple bandpass filter working at audio frequencies. Clearance DDM is then recovered from the intermediate frequency by a second AM detector followed by conventional DDM computing circuitry.

DETAILED DESCRIPTION OF THE INVENTION

Figure 1:
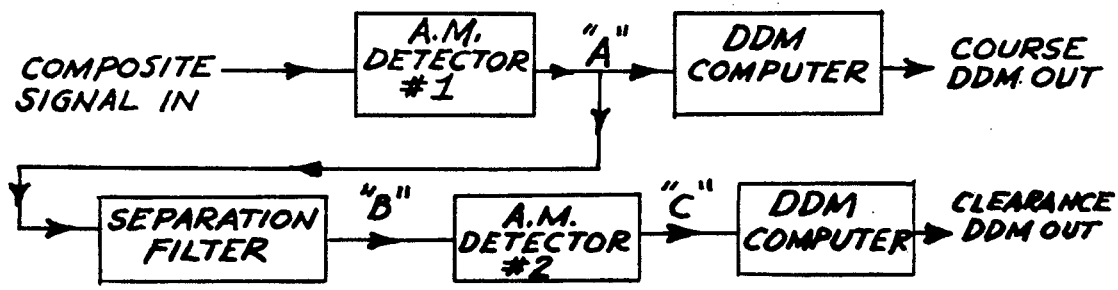
FIG. 1 is a block diagram of the invention, showing its subcircuits as blocks and indicating signal flow by arrows.
Figure 2:
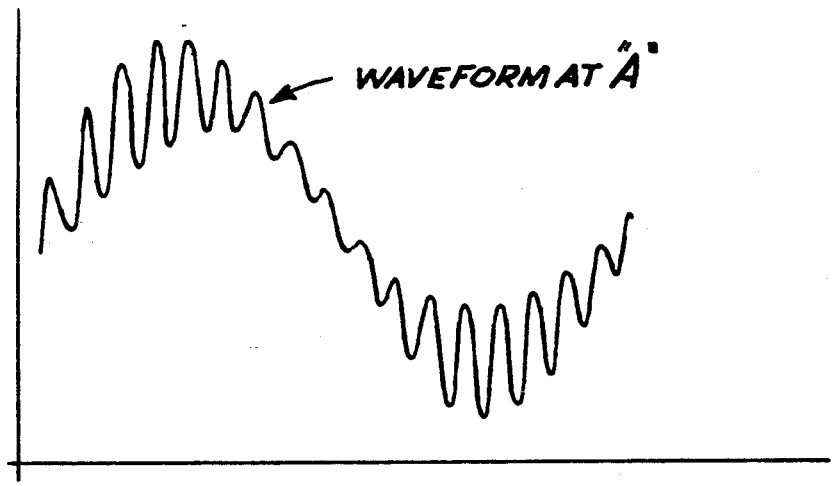
FIG. 2 illustrates the voltage waveform at point "A" of FIG. 1.

Referring to FIG. 1, composite Course and Clearance signal form an Integral Monitor recombinder is the input to AM detector #1, whose output voltage waveform is shown in FIG. 2 and consists of a superposition of:

a) A D.C. voltage proportional to Course carrier amplitude.
b) 90 hz. and 150 hz. voltages proportional to the respective amplitude modulations on the course carrier.
c) an amplitude modulated voltage of frequency $\Delta f$, where $\Delta f$ is the difference between Course and Clearance carrier frequencies.

The output of AM Detector #1 is input to:

1) A conventional DDM computing circuit which rejects voltage c), above, and computes Course DDm from voltages a) and b), above. This circuit is not part of the invention but is included for illustrative purposes because it would be present in any application of the invention.

Figure 3:
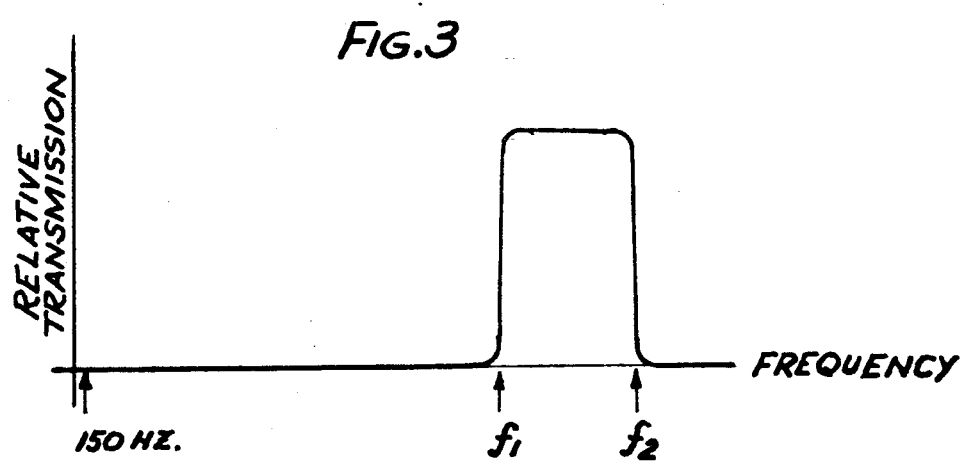
FIG. 3 shows the transmission characteristic of the separation filter of FIG. 1.

1) A separation filter having the transmission characteristic shown in FIG. 3. In FIG. 3, $f_1$ is equal to the lowest anticipated value of $\Delta f$, minus 150 hz., and $f_2$ is equal to the highest anticipated value of $\Delta f$, plus 150 hz.. $f_1$ and $f_2$ will be the lowest and highest spectral components of voltage c), above, that will be encountered in practice, where $\Delta f$ is subject to drift and may vary from one installation to another.

Figure 4:
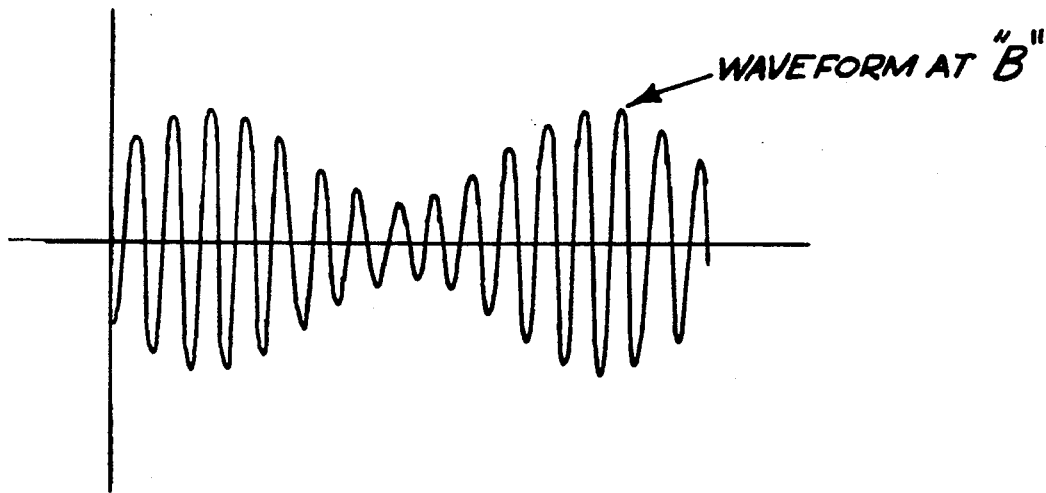
FIG. 4 illustrates the voltage waveform at point "B" of FIG. 1.
Figure 5:
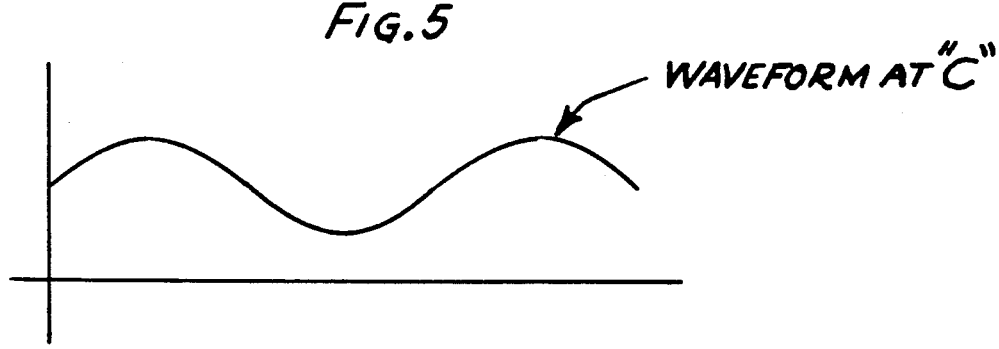
FIG. 5 illustrates the voltage waveform at point "C" of FIG. 1.

Output of the separation filter is illustrated by FIG. 4, and consists of a carrier at frequency $\Delta f$, amplitude modulated with percentages of 90 z. and 150 hz. equal to those on the Clearance carrier of the composite signal. Separation filter output is input to AM detector #2, whose output is illustrated in FIG. 5 and which consists of a D.C. voltage proportional to the clearance carrier of the composite signal input, and superimposed 90 and 150 hz. voltages proportional to the amplitude modulations impressed on the Clearance carrier of the composite signal input. The output of AM detector #2 is supplied to a conventional DDM computing circuit whose output is Clearance DDM.

I claim:

1. A monitor for the transmission of a two-frequency Instrument Landing System Localizer transmitting antenna array, said array simultaneously radiating a course signal consisting of a radiofrequency carrier amplitude modulated by 90 hertz and 150 hertz and a clearance signal consisting of a radiofrequency carrier amplitude modulated by 90 hertz and 150 hertz, the radiofrequency carrier of said clearance signal differing in frequency from the radiofrequency carrier of said source signal by an amount $\Delta f$ hertz, $\Delta f$ being in the range 4 to 10 kilohertz, the purpose of said monitor being to monitor clearance transmissions as if they existed alone and without course transmissions, said monitor consisting of the combination, an input signal proportional to the composite course and clearance signal that would be received by an aircraft at a specific angle from the centerline of the runway served by said localizer, an amplitude modulation detector whose input is said input signal, a separation filter whose input is the output of said amplitude modulation detector, said filter not passing frequencies of 0 hertz, 90 hertz, and 150 hertz, said filter passing frequencies of $\Delta f$ hertz, $\Delta f \pm 90$ hertz, and $\Delta f \pm 150$ hertz, means for measuring the difference between the percentages of 90 hertz and 150 hertz amplitude modulations of an amplitude modulated carrier having a frequency $\Delta f$, input to said means being the output of said separation filter.

* * * * *